Dec. 8, 1964  L. W. JACOBS ETAL  3,160,791
PLUG-IN TYPE PANEL UNIT
Filed May 9, 1962  2 Sheets-Sheet 1
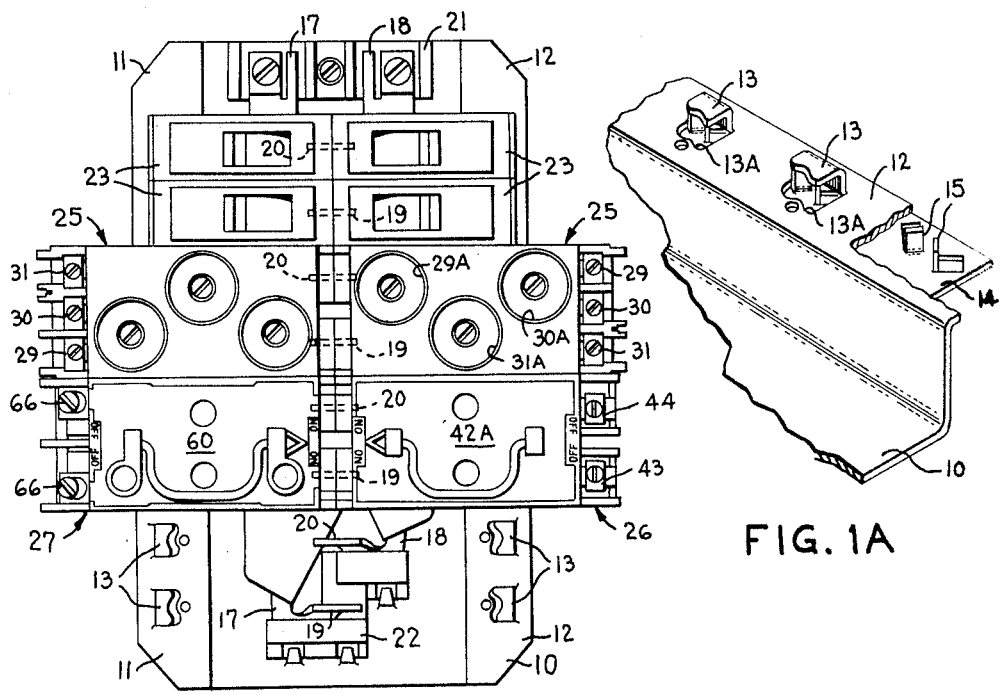
FIG. 1
FIG. 1A
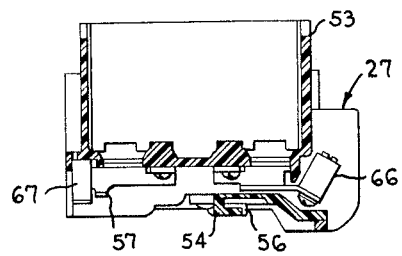
FIG. 3
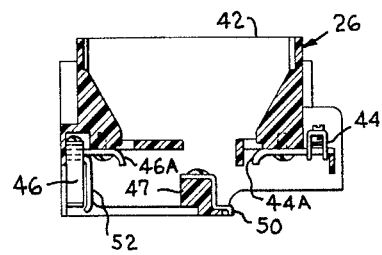
FIG. 2
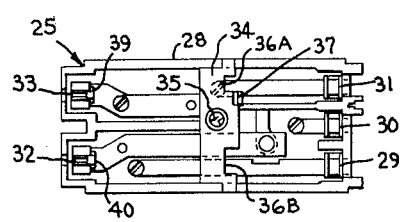
FIG. 4
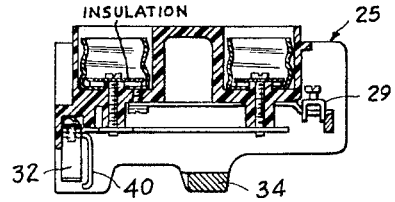
FIG. 4A
INVENTORS
LEWIS W. JACOBS,
ROBERT J. SABATELLA
BY Robert F. Casey
ATTORNEY Dec. 8, 1964   L. W. JACOBS ETAL   3,160,791
PLUG-IN TYPE PANEL UNIT
Filed May 9, 1962   2 Sheets-Sheet 2

INVENTORS
LEWIS W. JACOBS,
ROBERT J. SABATELLA
BY Robert P. Casey
ATTORNEY

United States Patent Office 3,160,791
Patented Dec. 8, 1964

3,160,791
PLUG-IN TYPE PANEL UNIT
Lewis W. Jacobs, West Hartford, and Robert J. Sabatella, Southington, Conn., assignors to General Electric Company, a corporation of New York
Filed May 9, 1962, Ser. No. 193,567
2 Claims. (Cl. 317—119)

The present invention relates to electric power control devices for use in panel assemblies, and particularly to control devices of the type adapted to be mounted in a panel assembly by plug-in engagement with stationary contacts carried by such panel assemblies.

Plug-in type panel assemblies have come into widespread use for use in the control of lighting and power circuits in applications such as service entrance equipment in homes, and branch lighting control in commercial and business buildings. One type of such panel assembly, utilizing plug-in type circuit breakers, is shown, for example, in Patent No. 2,738,446, W. J. Fleming, assigned to the same assignee as the present invention.

Also, in accordance with a prior application, Serial No. 150,831, H. J. Hammerly, filed November 7, 1961, now Patent No. 3,135,895, issued June 2, 1964, and assigned to the same assignee as the present invention, a plug-in type unit is provided, which is adapted to be received on a panel assembly of the type shown in the aforesaid Fleming patent and which receives fuse devices.

The plug-in type fusible (fuse-receiving) device of the aforesaid Hammerly application includes means compatible with existing circuit breaker plug-in type panel assemblies, for preventing the unauthorized interchanging of such plug-in fusible units by the user. The interchanging-prementing means of the Hammerly patent however, is defeatable by simply mounting the unit in a laterally offset position, that is, in a position in which the unit's retaining means is not under the retaining hook of the panel. In addition, the unit of the Hammerly application is usable only with screw-base type fuses, and cannot receive cartridge-type fuses.

It is an object of the present invention to provide plug-in type fusible panel units usable in existing panel assemblies formerly capable of accepting only circuit breakers, and including keying means compatible with keying means provided for use in connection with such circuit breakers for preventing improper interchanging of such devices which is not readily defeatable.

It is another object of the invention to provide plug-in type fusible panel units capable of receiving relatively large cartridge type, fuses, such as 30 ampere and 60 ampere ratings.

In accordance with the invention in one form, a plug-in type fusible panel unit is provided comprising a generally rectangular, box-like insulating body having a pair of plug-in type contact sockets at one end thereof and wire-receiving terminals at the other. The over-all length of the body is substantially greater than the distance between the stationary contacts and associated retaining hooks of the panel on which it is to be used. A bridging member is provided intermediate the ends of the body at the back thereof, extending between the side walls. The bridging member includes at least one mounting foot, disposed at a preselected location and constructed to permit the unit to be mounted only at certain predetermined locations on a panel. In addition, a stop member is provided adjacent each such plug-in type socket, which, combined with the mounting foot structure, prevents improper mounting of the unit.

In accordance with another aspect of the invention in one form, the box-like body is provided with means for mounting a pair of relatively large cartridge type fuses. The cartridge fuses are disposed by such mounting means in vertically offset relation, whereby two such fuses may be accommodated within a minimum transverse dimension.

In the drawings,

FIGURE 1 is a plan view of a control panel assembly including plug-in fusible units in accordance with the invention, shown together with conventional plug-in type circuit breakers;

FIGURE 1A is a fragmentary perspective view of a flange portion of the panel assembly of FIGURE 1;

FIGURE 2 is a sectional view of a first plug-in fusible panel unit in accordance with the invention, the fuse-carrying cap being removed;

FIGURE 3 is a sectional view of a second plug-in fusible panel unit in accordance with the invention, the fuse-carrying cap being removed;

FIGURE 4 is a bottom plan view of a third plug-in fusible panel unit in accordance with the invention;

FIGURE 4A is a side elevation view in section of the unit shown in FIGURE 4;

Figure 5:
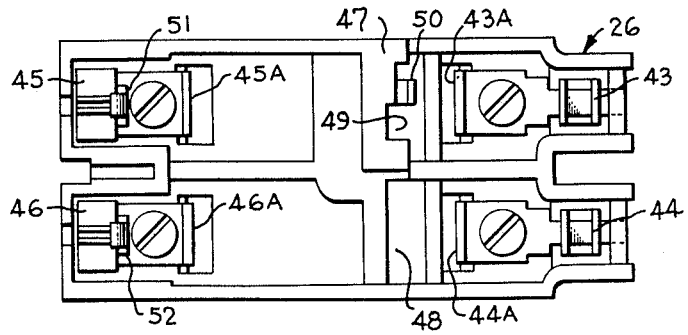
FIGURE 5 is a bottom plan view of the unit of FIGURE 2.
Figure 6:
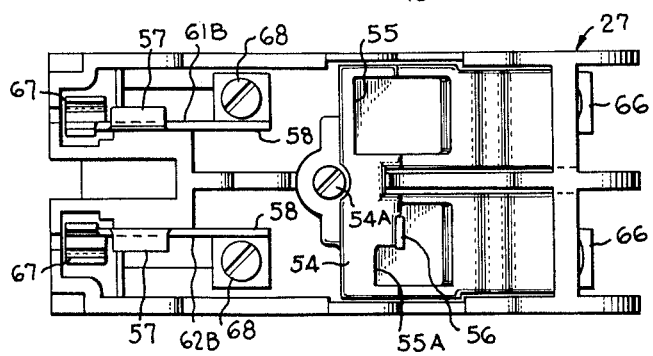
FIGURE 6 is a bottom plan view of the unit of FIGURE 3.
Figure 7:
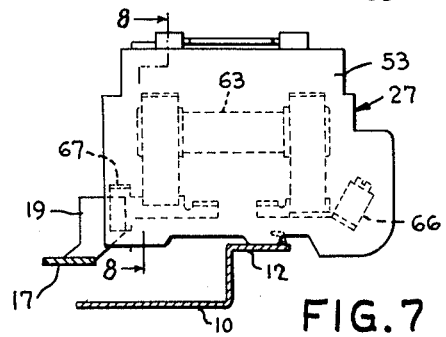
FIGURE 7 is a second side elevation view of the unit of FIGURE 3.

In FIGURE 1, there is shown a control panel assembly incorporating plug-in fusible panel units in accordance with the invention, and comprising a generally channel-shaped supporting pan or tray 10. The pan 10 includes a back wall and a pair of outwardly-directed side flanges 11, 12, each having a series of hook-shaped retaining elements 13.

Each of the flanges 11, 12 has a keying strip 14, only one shown, see FIGURE 1A. The keying strip 14 has a number of blocking tabs 15 struck upwardly therefrom, and disposed so that when the keying strip 14 is attached to the underside of the flanges 11, 12, the blocking tabs 15 project upwardly through openings 13A in the flanges, beneath the retaining hooks 13, there being a pair of such tabs under each of said hooks.

The blocking tabs are adapted to be selectively removed such as by breaking off prior to assembly of the keying strip on the flanges 11, 12, or, alternatively, by use of a special tool, not shown, after assembly of said strip.

Thus under any given hook 13, there may be provided selectively, (a) two of such blocking tabs, (b) a "right-hand" tab only, (c) a "left-hand" tab only, or (d) no blocking tabs.

The supporting pan 10 also includes a pair of conductive bus bars 17, 18, having a number of upstanding contact blades 19, 20 respectively, attached thereto and disposed in a row centrally of the supporting pan.

The bus bars 17, 18 are supported in insulated relation on the pan 10 by suitable means, such as by insulating blocks 21, 22.

The panel assembly described above is adapted to receive a plurality of electric circuit breakers 23, each having a portion at one end adapted to be received under a corresponding retaining hook 13, and having a plug-in type socket at the other end adapted to contact a portion of one of the blades 19, 20.

Each of the circuit breakers 23 has its casing provided with metallic blocking members, in accordance with a predetermined arrangement, keyed to the current capacity of the breaker, to permit the breaker to be mounted under only certain of said retaining hooks, such as a hook having only a "right," "left," both or no blocking tabs, thereunder.

The panel construction and arrangement as described above, consisting of a supporting pan with flanges, bus bars with blades, and plug-in type circuit breakers, together with the keying means described, is in accordance with prior art existing prior to the present invention.

In accordance with the present invention, plug-in fusible units are provided which are usable with the above-described panel assembly, and including means likewise keyed to the current capacity of the units, to permit mounting of said units only under certain predetermined retaining hooks.

The invention is shown as incorporated in three plug-in fusible units as follows: (1) a "plug-fuse" type unit 25 (two shown), (2) a "30-ampere" cartridge fuse unit 26, and (3) a "60-ampere" cartridge fuse unit 27. Each of the units 25, 26, 27, has an over-all length substantially greater than the distance between the contact blades 19, 20, and the corresponding retaining hooks 13.

Referring first to the plug-fuse type unit 25, a top-view of which is shown in FIGURE 1, and a bottom view of which is shown in FIGURE 4, this unit includes a generally rectangular insulating box-like body 28. The body 28 has three load terminals 29, 30, 31 supported thereon at one end, and a pair of plug-in type sockets 32, 33 supported thereon at the other end.

The terminal 29 is connected, through a suitable plug-fuse socket 29A, to the socket 32. The terminals 30 and 31 are connected, through suitable plug-fuse sockets 30A and 31A, respectively, to the terminal 33.

For the purpose of permitting mounting of the unit 25 under only certain retaining hooks 13, a bridging member 34 is provided at the back wall of the body 28, intermediate the ends. The bridging member 34 is fixedly attached to the body 28 by means of a screw 35.

The bridging member 34 has a pair of cut-out portions or notches 36A, 36B. The notch 36A is of a width to provide clearance for one blocking tab. Adjacent the notch 36A there is provided a metal mounting foot element 37, fixedly attached to the bridging member 34 such as by cementing.

By reasons of this construction, the unit 25, as regards this portion of the bridging member, may be mounted only under a retaining hook having at least one of said blocking tabs removed, i.e., the tab corresponding to the location of the mounting foot 37.

The notch 36B is of a width to provide clearance for two blocking tabs, and therefore the unit 25, as regards this portion of the bridging member, may be mounted at any retaining hook location.

In addition to the provision of a bridging member having clearance notches and mounting feet at predetermined locations, the invention also includes means for preventing mounting of the unit on the panel unless the mounting foot or feet of the bridging member is inserted under one or more mounting hooks, as required.

For this purpose, each of the plug-in type sockets 32, 33, is provided with a rigid metallic blocking member 39, 40, extending closely adjacent the opening of the socket. Thus, if it is attempted to mount the unit 25 on a pair of blades 19, 20, without inserting the mounting foot 37 under a corresponding restraining hook, the blocking elements 39, 40, will strike the edge of the blades 19, 20, preventing mounting of the device.

In FIGURES 2 and 5, the invention is shown as applied to a "30-ampere" plug-in fusible panel unit 26, also comprising a generally box-like insulating body 42, having open top and bottom walls. The body 42 is adapted to receive a fuse-carrying cap 42A shown in place in FIGURE 1, but removed in FIGURES 2 and 5.

The unit 26 includes a pair of terminals 43, 44, adapted to be connected by contacts 43A, 44A through suitable fuse devices, carried by the removable cap 42A, to a corresponding pair of contacts 45A, 46A, to plug-in type sockets 45, 46, respectively.

In this form, the bridging portion 47 is made integral with the body 42. The bridging portion 47 includes notches 48, 49, and a metallic mounting foot 50, see FIGURE 5, positioned in one of said notches at a predetermined location. Thus the unit 26 may be mounted only at a location on the panel where the mounting foot 50 may enter under a corresponding retaining hook 13 which has the blocking tab removed at the location corresponding with that of the foot 50.

Blocking elements 51, 52 are also provided, adjacent the sockets 45, 46, respectively, to prevent mounting the unit on blades 19, 20 without inserting the foot 50 under a hook 13.

In FIGURES 3 and 6–9, the invention is shown as incorporated in a "60-ampere" plug-in fusible panel unit 27, also having a generally box-like insulating body 53. The body 53 carries a pair of load terminals 66 at one end, which are adapted to be connected, through fuses 63, 64 to a pair of line terminal sockets 67 at the other end. A bridging member 54 is attached to the bottom of the unit intermediate its ends by means of a screw 54A. The bridging member has notches 55 and 55A. At the location corresponding to that of a retaining hook, the unit has a metallic mounting foot 56 having a width such that it cannot be inserted under a hook 13 unless one of the blocking tabs 15 has been removed.

Blocking elements are also provided, comprising members 57, bent over from members 58 mounted in the body 53 adjacent the sockets 67. The sockets 67 and blocking members 57, in this form, are made of a single piece and fastened to the body 53 by means of screws 68.

Figure 8:
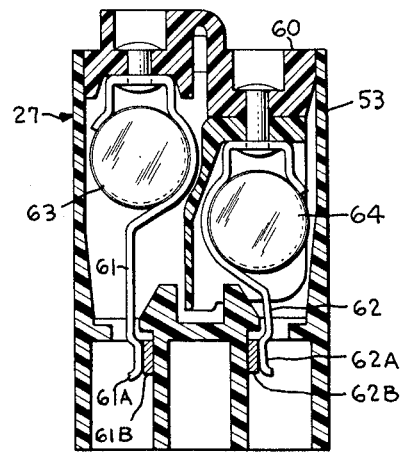
FIGURE 8 is a sectional view of the unit of FIGURE 7 taken substantially on the line 8—8 of FIGURE 7.
Figure 9:
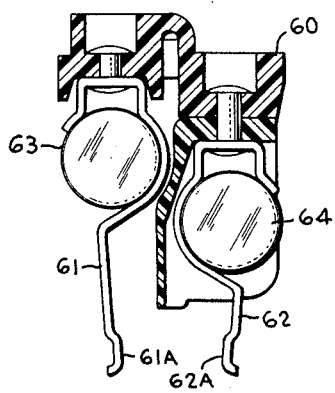
FIGURE 9 is a sectional view similar to FIGURE 8, showing only the removable fuse-carrying cap.

In accordance with another aspect of the invention, the unit 27 includes a novel removable fuse-carrying cap 60, see FIGURES 8 and 9.

The cap 60 carries two pairs of generally inverted J-shaped fuse-retaining clips 61, 62. Each of the clips 61, 62 has an end 61A, 62A, extended to form a contact member adapted to engage a corresponding stationary contact 61B, 62B carried by the body 53.

The clips 61, 62, are each adapted to receive an end of an cartridge-type fuse 63, 64. The fuses 63, 64, are of such size that it would not be possible to mount them in the usual side-by-side arrangement within the width of the body 53.

At the same time, it is not possible to increase the width of the body 53 proportionally, since this would cause the unit to occupy so much space on the panel of FIGURE 1 when connected to two adjacent contact blades 19, 20, as to interfere with space required for units plugged onto adjacent contact blades.

In accordance with the invention, therefore, the fuse clips 61, 62 are disposed and arranged so as to hold the fuses 63, 64 in vertically offset or staggered relation, as shown, whereby the lateral space requried for mounting such fuses is substantially less than that which would be required if such fuses were mounted in conventional side-by-side arrangement.

While the invention has been shown as embodied in only certain specific forms, it will be appreciated that many modifications thereof may readily be made, and it is therefore intended that the appended claims shall cover all such modifications as fall within the true spirit and scope of the invention.

What we claim as new and desire to secure by Letters Patent of the United States is:

1. A plug-in type electrical control device comprising:
   (a) a generally rectangular insulating body,
   (b) at least two electrical sockets carried by said insulating body adjacent one end thereof, each of said electrical sockets comprising a pair of jaw members for use with blade type stationary contacts, (c) at least one pivotal supporting means carried by said insulating body spaced away from a corresponding one of said electrical sockets, whereby to permit inter-engagement of said pivotal retaining means with a portion of an electrical panel and rotation of said control device about said pivotal engagement to move said socket into plug-in type engagement with said blade type contacts, (d) a metallic interfering member carried by said insulating body and including a portion extending closely adjacent the entrance of said contact jaws at the side thereof adjacent said pivotal retaining means, whereby to prevent mounting of said control device on said stationary contact blades unless said pivotal retaining means is at least a predetermined distance away from said relatively stationary contact blades.

2. For use in a panel having a support, a row of stationary contact blades supported on said support, and a row of hook-like panel unit retaining elements disposed in parallel spaced-apart relation to said row of stationary contacts, a plug-in type electrical control device comprising:

(a) a generally box-like insulating body having opposed side walls and opposed end walls, (b) mounting means carried by said insulating body adjacent one of said end walls for cooperation with one of said hook-like panel unit retaining elements, (c) at least one plug-in type electrical socket carried by said insulating body adjacent one end wall thereof, whereby said mounting means of said insulating body may be interengaged with said hook-like retaining element of said panel and said body may be rotated about said interengagement to move said socket into plug-in electrical engagement with one of said contact blades, (d) said insulating body having no portion thereof immediately adjacent said plug-in type socket and between said socket and said mounting means, and (e) a metallic blocking member fixedly attached to said insulating body and including a portion extending closely adjacent said plug-in type socket and between said socket and said insulating body mounting means whereby to prevent mounting of said insulating body with said socket on one of said blades if said mounting means of said insulating body is not in engagement with one of said retaining elements of said panel.

References Cited by the Examiner

UNITED STATES PATENTS

| | | | |
|---|---|---|---|
| 1,043,802 | 11/12 | Carson | 200—133 |
| 2,072,730 | 3/37 | Corbett | 200—114 |
| 2,259,142 | 10/41 | Schuck | 200—133 |
| 2,899,521 | 8/59 | Salomone | 200—133 |
| 2,961,512 | 11/60 | Stanback et al. | 200—114 |
| 3,041,505 | 6/62 | Norden | 317—119 |
| 3,089,063 | 5/63 | Middendorf et al. | 317—119 |

FOREIGN PATENTS

| | | |
|---|---|---|
| 65,645 | 12/25 | Sweden. |
| 1,181,741 | 6/59 | France. |
| 1,264,428 | 5/61 | France. |

JOHN F. BURNS, *Primary Examiner.*